Figure 1:
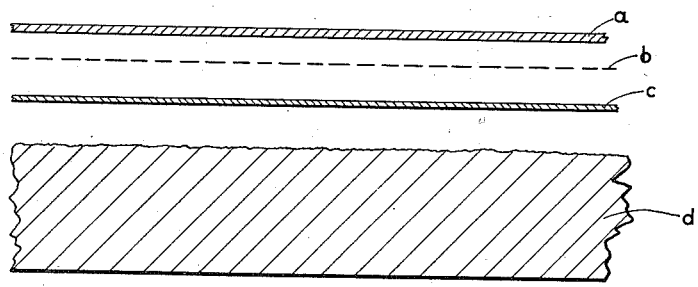

Feb. 16, 1943.  L. V. CASTO  2,311,156

DECORATING AND MOLDING OF TRANSPARENT SHEETS

Filed Sept. 6, 1940

INVENTOR.
LLOYD V. CASTO
BY *Fay, Macklin, Golrick,*
*Williams, Chilton and Isler*
ATTORNEYS.

Patented Feb. 16, 1943

2,311,156

UNITED STATES PATENT OFFICE 2,311,156

DECORATING AND MOLDING OF TRANSPARENT SHEETS

Lloyd V. Casto, Detroit, Mich.

Application September 6, 1940, Serial No. 355,689

11 Claims. (Cl. 18—61)

This invention is directed to improvements in the art of forming decorated articles of manufacture and the general object thereof is the provision of a novel method of manufacturing decorated articles by combining and molding materials in such manner that articles having highly decorative surface appearances may be produced by the utilization of inexpensive base materials.

A further object of the present invention is the provision of articles of manufacture formed from moldable material, which articles, while having wear resisting surfaces with decorative appearances, may be manufactured economically for a variety of utilities.

A further object of the invention is the provision of a novel transparent sheet structure, having an alkali and acid and wear-resisting surface on one side thereof and a decorated undersurface, the sheet structure being composited in such manner as to permit the molding or permanent forming of the sheet without resultant distortion or deterioration of the decorative medium carried by the under surface of the sheet.

A still further object of the present invention is the production of an article of manufacture by the use of materials which can be thermally set to permanent shape, the composite structure including a predecorated surface sheet.

Other objects of the invention will become apparent to those skilled in the art from the description thereof hereinafter set forth in the accompanying specification. The essential objects of the invention are summarized in the claims.

The present invention contemplates the manufacture of various articles, where the requirement of having a finished or decorative surface is present, and the invention broadly contemplates the utilization of a transparent sheet of moldable material, which is compatible to uniform and permanent bonding while carrying a decorative medium applied to one surface thereof. The sheet may be formed of any one of a number of compositions, the base of which may comprise a nitrocellulose, a cellulose acetate, a vinylite, a Bakelite, or any base material which is selected from the well-known compositions which are adaptable to the formation of a thermally moldable or formable transparent sheet.

The decorative medium may be in the form of a print portraying wood grains, marbles, tile or any other desired decorative appearance, and the print may be obtained by any of the well known processes, such as lithography, photogravure or half-tone printing. However, the decorative medium, in accordance with this invention, will comprise a decorative print formed of a material which will form an intimate bond with one surface of the transparent sheet. A ground coating of material is placed over the decorative print in intimate or bonded relation to the sheet material and the material comprising the decorative print. It is to be understood, that in each instance, the physical and chemical characteristics of the materials comprising the decorative print and the materials comprising the ground coat will be determined to a certain extent by the materials comprising the transparent sheet.

A transparent sheet composition selected for use in this invention must be such as to be thermally formable and settable to the desired shape within practical manufacturing limits. The sheet should be weather-resistive and immune to the action of sunlight, heat, mild abrasives, mild acids and alkali solutions and remain colorless during the molding or forming operations and throughout a period of protracted use. The sheet composition should also be such that the base material thereof is available at low cost and so that the same can be processed into a sheet or web form economically.

The materials forming the decorative medium should be such as to be pigmentable and remain color-fast under light exposure and during temperature rises while the thermal forming operations of the sheet are being effected. The solvents used for the decorative materials should be such that the decorative print will bond thoroughly to the sheet surface. The decorative material should also be non-shrinkable relative to the sheet material, and be formable with the sheet without cracking and without discoloration at temperatures required to effect the thermal forming of the sheet.

The ground coating material should be such as to be color fast under the conditions above set forth, should be compatible to a variety of color tinting ranges, whereby the desired complementary color to the print color will be obtainable, and should be such that the solvents therefor will not be deleterious to the materials forming the sheet and the materials forming the decorative medium.

Other properties and characteristics of the ground coat, such as the bonding thereof to the decorative medium and to the sheet, and to the base or back-up material forming the body of the molded article are obtainable by a controlled variation in the quantity and the physical characteristics of the materials used to form the ground coat relative to the physical and chemical characteristics of the particular compositions used to form the sheet.

The base material or back-up material may comprise a treated vegetable fibre, a conglomerate of rag and paper, sawdust or sawdust and earth filler treated with materials without sawdust, and, in fact, any economically available back-up material formed of particles which will practically flow and form or mold within the temperature ranges and pressures requisite to the proper thermal forming or shaping of the decorated sheet.

The accompanying drawing shows several articles made in accordance with the present invention.

Figure 2:
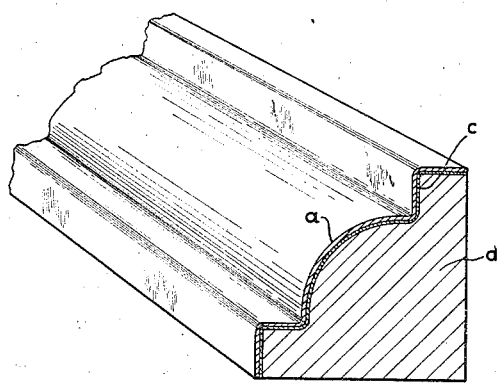
Figure 3:
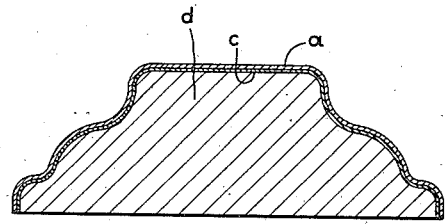

Fig. 1 is a diagrammatic view of the layers forming any one of the articles; Fig. 2 shows in a fragmentary perspective view part of a decorated article; Fig. 3 illustrates a lamp support; and Fig. 4 part of a tile slab.

Figure 4:
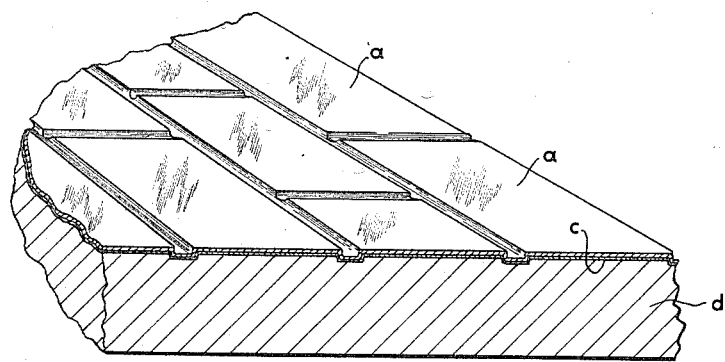

In Fig. 1, $a$ designates the transparent sheet or film, $b$ the decoration, $c$ the ground coat and $d$ the backing, all of which have been more fully described as regards their composition and properties and are going to be exemplified hereinafter. In Figs. 2 to 4 the same reference characters are used to designate corresponding layers, the decoration being so thin a layer in cross-section that it has been omitted in these latter views.

The order of formation of the sheet, the decorative medium and the back-up or base material may vary, but in all instances the transparent sheet is formed first and the decorative medium is applied to one surface thereof, prior to any molding or thermal forming of the sheet. The sheet may be molded or preformed to the desired surface shape. Thereafter the back-up material may be applied to the decorated side of the formed sheet and pressure applied thereto to cause the back-up material to be formed to the desired shape. This operation will cause the back-up material to bond to the ground coat material. These steps may be carried out while the film is being supported by a mold member used for forming or shaping the sheet.

The base material, when the molding and setting temperature thereof are considerably higher than the forming or molding temperature of the sheet, may be preliminarily molded and thereafter the decorated sheet may be placed upon the preformed base material with the ground coating side thereof in contact with the base material whereupon a second molding operation will cause the sheet to conform to the molded shape of the base material.

In this manner of molding the sheet upon a premolded base, a coating of bonding material may be applied to either the ground coated surface of the film or to the base material, and the constituents of this bonding material should be such as to have no deleterious effect upon the ground coating.

In certain instances it would be desirable to place the sheet material with the outer face thereof downward in a mold member and with back-up material placed upon the ground coated side of the sheet and thereafter shape the sheet and back-up material by either one heat and pressure application thereto or merely a pressure application while all the materials are in the mold.

Base materials suitable for the forming of a transparent sheet adaptable for use in the present invention may comprise cellulose acetate, nitrocellulose, vinyl acetate, vinyl chloride acetate, cellulose butyrate, poly-vinyl acetate, ethyl cellulose or other base materials or resins which are slightly soluble in solvents that can be used as solvents in forming the materials comprising the decorative medium and the materials forming the ground coats and which solvents are available commercially.

The materials from which the decorative medium may be formed will be determined, to a considerable extent, by the characteristics of the sheet material which has been selected for the purposes of practicing this invention. The decorative medium, for instance, should have substantially the same degree of plasticity as the sheet material to meet the molding requirements. The decorative material should be such that the solvent therefor will have a slight solvent action upon the sheet surface to thereby effect the desired bond with the film without distorting the sheet. The solvent should be such that a practical drying of the decorative medium can be effected economically. Other considerations will enter into the selection of the materials comprising the decorative media, such as the physical requirements of such materials when successfully used on a half-tone etching or when the same are to be used on a photogravure etching.

Should it be desired to obtain the design by a lithographic process, further variations in the physical characteristics of the materials forming the decorative media will be required.

The selection of the materials from which the ground coatings may be formed is determined in much the same manner as the selection of the decorative materials, and in addition thereto the dried ground coating must be such that any of the volatile matter present in the moldable base materials will not have a rapid solvent action on the ground coat materials. Likewise, should a bonding coat be required to bring about a satisfactory adherence between a premolded base material and the ground coat of the decorated sheet to be shaped thereover, such bonding material should be such as to have only a slight solvent action upon the surface of the ground coat and not penetrate therethrough.

A specific example of a selection of the various materials to be used in producing a decorated article will be given to show the practical application of the present invention, but not in limitation thereof.

A transparent film may be formed using a cellulose acetate base or resin which may comprise either a transparent sheet or a translucent sheet of predetermined color. The sheet may be formed by a film gathering process or by roll plastic forming or by other practical methods. Such a sheet has been found to have the requisite properties hereinbefore stated.

The cellulose acetate sheet may be decorated by the application to one surface thereof, of a pigmented or dyed ground coating should a plain color decoration be desired. This coating may comprise a lacquer having a cellulose acetate base or a phenol-modified alkyd resin base. Should it be desired to use ground coating materials, the solvents of which would act unfavorably on the cellulose acetate sheet, a thin coating of poly-vinyl chloride resin may be applied thereover.

If the cellulose acetate sheet is to be decorated by the use of a transfer medium, such for example as is available through the use of the well-known offset photogravure process, the ink used may have a phenol modified alkyd base, in which case the solvents may comprise beta terpineol or pine oil and toluol and the resin cumaron treated with a suitable plasticizer, such as rosin oil or boiled linseed oil. If desired, a cumaron resin may comprise the base with high boiling coal tar, naphtha and pine oil as the solvents therefor and the rosin oil or boiled linseed oil in relatively small quantity can be used to control the evaporation rate of the solvents.

It has also been found that a toluene-sulfonamide-formaldehyde resin may form the base of an ink for the purpose stated, in which case pine oil and a synthetic ester solvent may comprise the solvent agents.

The drying periods of the specific inks mentioned are quite rapid and only of sufficient duration to permit the print transfer to bond in the desired manner, to the transparent sheet.

Such a decorated sheet may then be placed in a mold with the decorated side face up. The back-up material may then be spread thereover, either uniformly as to thickness of layer or varied in thickness in accordance with the ultimate shape which is to be produced.

The amount of heat required will depend upon the materials which have entered into the decorated sheet structure, the thickness of the same and the type of back-up materials used. In some instances I have been able to form or shape a decorated film in the presence of only slightly raised temperatures of the die or mold members during operations when the sheet was formed before the back-up material was applied.

The degree of pressure required to form the sheet material is nominal compared to the pressure required to shape the back up material and accordingly the range of pressures will depend upon the mix of the back-up and the amount of tensile strength desired in the finished product.

I claim:

1. The method of forming predecorated articles having finished surfaces comprising forming a transparent film-like sheet of material having a base of cellulose acetate, applying to one side of the film-like sheet a decorative design in the form of an intaglio transfer comprising an ink containing a toluene-sulfonamide-formaldehyde resin, applying over the design on the film-like sheet a coating of material which is capable of ready bonding with the sheet material and the ink, placing the film-like sheet thus decorated in a forming apparatus and applying pressure to the sheet to draw it to a desired shape and thereafter applying a back-up material by the use of heat and pressure to said coating material, the back-up material having mold flowing properties and having a binding medium for causing adherence to said coating material.

2. The method of producing a decorated molded product comprising applying to one side of a film-like sheet of transparent organic plastic material of sufficient body thickness to afford ready handling, a decorative medium in the form of an intaglio transfer comprising ink materials capable of ready bonding to the film-like sheet without physical distortion of the sheet and whereby the bond will be such as to maintain permanent non-flowing adherence of the transfer to the sheet during a subsequent hot forming of the film-like sheet, applying over the transfer on said one side of the film-like sheet a colored coating of material substantially less in thickness than the thickness of the transparent film-like sheet and having a color complementary to the transfer whereby the colors of the transfer and said over coating blend and modify each other as viewed through the transparent sheet, placing the sheet thus decorated and in dry condition in a forming press and applying sufficient heat and pressure to the sheet to cause the same to be drawn to the desired form without distortion or flow of the materials comprising the transfer and said over coating, then bonding said shaped sheet on to a base structure pre-shaped to conform to the shape of formed sheet with the opaque coating in bonding relation to the base material.

3. The method of producing a decorated molded product comprising applying to one side of a transparent sheet-like film of organic plastic material of sufficient body thickness to afford ready handling, a photographically derived decorative medium in the form of an intaglio transfer comprising ink materials which are capable of ready bonding of the transfer to said one side of the sheet and whereby the bond will remain effective during a subsequent hot forming of the sheet-like film, applying over the transfer on the sheet a colored coating of material having a color complementary to the color of the ink comprising the transfer and to thereby have said colors blend and tonally modify each other when viewed through the transparent sheet, placing the sheet thus decorated and in dry condition in a forming press and applying sufficient heat and pressure to the sheet to cause the same to be drawn to the desired form without causing distortion or flow of the materials comprising the transfer and the colored coating.

4. The method of producing a decorated molded product comprising applying to one side of a relatively thin sheet-like film of transparent organic plastic of sufficient body thickness to afford ready handling, a decorative medium in the form of a photographically derived intaglio transfer comprising ink materials which are capable of ready bonding to the sheet-like film without solvent distortion of the sheet and whereby the bond will be such as to maintain permanent adherence of the transfer to the sheet during a subsequent hot forming of the sheet, applying over the transfer on the sheet a colored coating of material substantially less in thickness than the thickness of the transparent sheet and having a color complementary to ink comprising the transfer whereby said transfer and said coating colors blend and tonally modify each other as viewed through the transparent sheet, placing the sheet-like film thus decorated and in dry condition in a forming press, applying sufficient heat and pressure to the sheet to cause the sheet to be drawn to the desired form without causing distortion or flow of the materials comprising the transfer and the said coating, then backing up said formed decorated sheet with a moldable material which will conform to the shape of formed decorated sheet under heat and pressure while the form of the sheet is maintained.

5. The method of producing a decorated molded product comprising decorating one side of a transparent film-like sheet of transparent cellulose acetate plastic material of sufficient body thickness to afford ready handling by applying a photographically derived decorative medium to said one side of the sheet in the form of an intaglio transfer comprising ink materials which are capable of ready bonding to the cellulose acetate sheet and whereby the bond will remain effective during a subsequent hot forming of the film-like sheet, applying over the transfer on the sheet a colored coating of material having a color complementary to the transfer whereby the transfer color and coating color blend and tonally modify each other as viewed through the transparent sheet, placing the film-like sheet thus decorated and in dry condition in a forming press and applying sufficient heat and pressure to the sheet to cause the sheet to be drawn to the desired form without causing distortion or flow of the materials comprising the transfer and the colored coating.

6. The method of forming predecorated articles having finished surfaces comprising forming a transparent film-like sheet of material selected from the group consisting of cellulose ethers, cellulose esters and vinyl esters, applying to one side of the sheet a decorative design comprising an intaglio transfer formed by using an ink the materials of which are capable of ready bonding with the material forming the film-like sheet and the ink materials are such as to permanently adhere to the film-like sheet during a sheet molding operation, applying to the film-like sheet over the intaglio design on the sheet a coating of material which is bondable to the sheet material and to the ink, placing the sheet thus decorated in a forming mold and applying heat and pressure to the film-like sheet to draw it to a desired shape while maintaining the product thus being drawn below the mold flowing temperatures of the ink and colored coating, then backing up the formed sheet with a suitable base material.

7. In the art of producing molded products, the process of making a decorated transparent film-like sheet of an organic plastic, which includes applying a decorative medium in the form of an intaglio transfer to one side of the film-like sheet, the decorative medium being formed of ink materials capable of firm bonding with the film-like material and non-flowable under temperature and pressure environments required to draw the sheet to desired form and selected from the group consisting of phenol modified alkyd resins, cumaron resins and toluene-sulfonamide-formaldehyde resins, applying a coating of colored material over the decorative medium which has a color complementary to the decorative medium and which is non-flowable under said temperature and pressure environments, drawing the sheet thus decorated to the desired shape and then backing up the formed sheet with a base material.

8. A drawn decorated article comprising a top sheet of a transparent sheet-like film of organic plastic material said drawn top sheet having bonded thereto throughout the area of the underside thereof a decorating medium in the form of an intaglio transfer composed of an ink having a binder selected from the group of synthetic resins consisting of phenol modified alkyd resin, cumaron resin and toluene sulfonamide formaldehyde resin capable of ready bonding to said sheet and resistant to heat required in the drawing operation, said sheet having a coating applied to said decorating medium consisting of a color complementary to the color of the ink comprising the decorating medium and also resistant to heat required in the drawing operation, whereby the colors blend and tonally modify each other when viewed through the transparent sheet, and a backing for said sheet intimately conforming to the drawn shape of said article and bonded to the said colored coating.

9. A drawn decorated article comprising a top sheet of a transparent sheet-like film of organic plastic material said drawn sheet having bonded thereto throughout the area of the underside thereof a decorating media in the form of an intaglio transfer design and a colored coating applied thereover, said decorating media comprising materials having a binder selected from the group of synthetic resins consisting of phenol modified alkyd resin, cumaron resin and toluene sulfonamide formaldehyde resin capable of ready bonding to said sheet and resistant to heat required in the drawing operation and a backing for said formed sheet intimately conforming to the drawn shape of said article and bonded to said colored coating.

10. A drawn decorated article comprising a top sheet of a transparent sheet-like film of cellulose acetate said drawn acetate sheet having bonded thereto throughout the area of the underside thereof a decorating media in the form of an intaglio transfer design and a colored coating applied thereover, said decorating media comprising materials having a binder selected from the group of synthetic resins consisting of phenol modified alkyd resin, cumaron resin and toluene sulfonamide formaldehyde resin capable of ready bonding to said sheet and resistant to heat required in the drawing operation and a backing for said formed sheet intimately conforming to the drawn shape of said article and bonded to said colored coating.

11. A drawn decorated article comprising a top sheet of a transparent sheet-like film of cellulose acetate, said acetate top sheet having bonded thereto throughout the area on the underside thereof a decorating media in the form of an intaglio transfer composed of an ink having a binder selected from the group of synthetic resins consisting of phenol modified alkyd resin, cumaron resin and toluene sulfonamide formaldehyde resin and a colored ground coating having a binder selected from the group of synthetic resins consisting of phenol modified alkyd resin, cumaron resin, toluene sulfonamide formaldehyde resin and cellulose acetate, and a backing for said sheet intimately conforming to the drawn shape of said article and bonded to the said colored coating.

LLOYD V. CASTO.